Aug. 20, 1957     B. H. HEFNER     2,803,696
INSULATING SEAL
Filed March 2, 1953
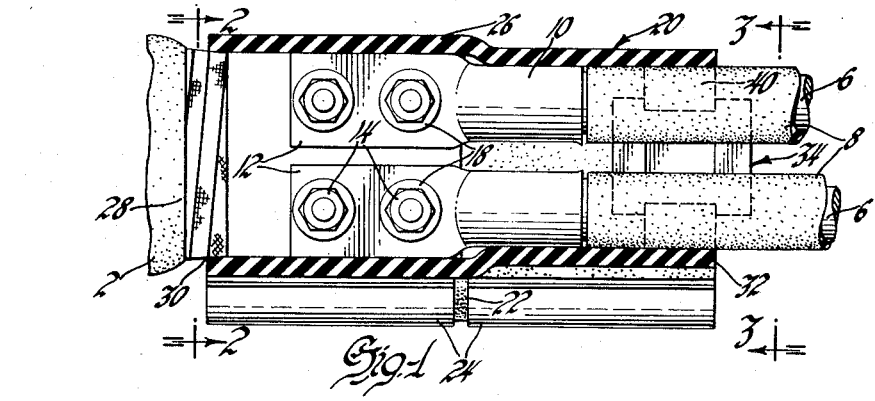
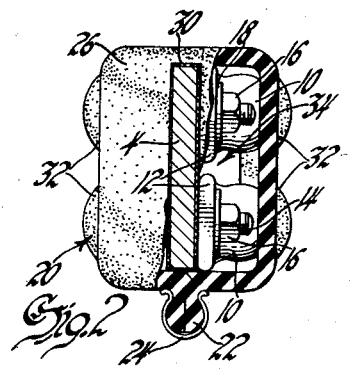
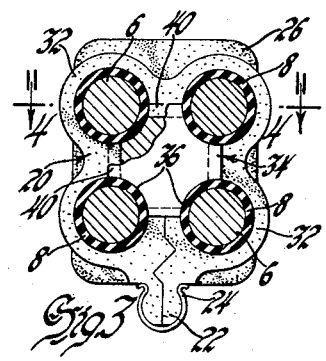
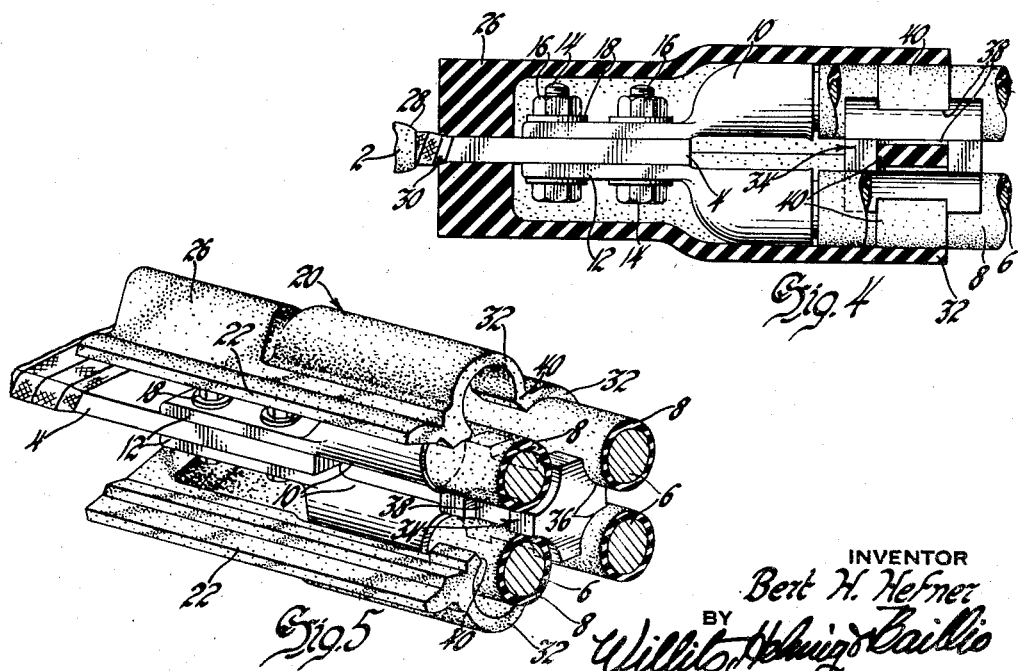
INVENTOR
Bert H. Hefner
BY Willits, Helwig & Gaillio
ATTORNEYS

United States Patent Office 2,803,696
Patented Aug. 20, 1957

2,803,696

INSULATING SEAL

Bert H. Hefner, La Grange, Ill., assignor to General Motors Corporation, Detroit, Mich., a corporation of Delaware Application March 2, 1953, Serial No. 339,814

2 Claims. (Cl. 174—88)

This invention relates generally to insulated cable connections and more particularly to insulating assemblies which serve to protect electrical cable and terminal connections from short circuiting and also to protect personnel who otherwise might come in contact with these electrical connections and be injured thereby.

This new insulating means has been illustrated and will be described in combination with the bus bars and connectors used for electrical generators and motors employed on diesel electric locomotives. It should be appreciated as the description proceeds, however, that this invention is not limited to diesel electric locomotives only, but has a much wider field of application.

When using an electrical generator and a plurality of traction motors to supply motive power for a diesel electric locomotive, it is usually necessary to have a large number of electrical cable connections between the generator and the traction motors. In order to connect the traction motors to the main generator it is common practice to provide a main bus bar on the plus as well as the minus side of the generator and then connect the plus and minus sides of the traction motors to the generator by means of insulated electrical conductors fastened to the aforementioned bus bars. For example, if there are four traction motors in the locomotive there will be four plus cables for the traction motors connected to the corresponding bus bar on the generator and there will also be four traction motor cables connected to the other bus bar on the generator. It will readily be appreciated that these cable connections must be insulated to prevent short circuits occurring between the cable connections and the adjacent metallic parts of the locomotive. The connections should also be insulated to protect any locomotive personnel from coming in contact with the connections in order to safeguard such personnel against pain or injury. In the past the most common practice for insulating these connections has been to wrap them with layers of insulating tape either before or after the generator has been mounted in the locomotive. It should be obvious that the wrapping of these cable connections is a rather costly and time consuming procedure. Furthermore, in cases where the connections must be disconnected from the generator or the generator has to be removed from the locomotive, this wrapped insulation has to be removed and later replaced with new insulating tape, since it is difficult if not impossible to remove the tape without damaging it. In other words, not only is the use of insulating tape time consuming and laborious; it is wasteful of expensive material as well.

A further objection to the use of insulating tape for wrapping these joints is that once the generator has been mounted on the locomotive it is located in a rather confined area, making it difficult to unwrap and rewrap the joints properly. Of course, the generator could first be removed from the locomotive, but obviously this would be a costly and laborious method of removing and reapplying insulation to the connecting joints.

It, therefore, becomes an object of this invention to provide an insulating assembly for electrical connections on generators which can be easily installed either after the generator is mounted in the locomotive or before, and which can be removed and repeatedly used without any damage to the insulating assembly.

It is a further object of this invention to provide a novel insulating jacket assembly for electrical connections which can be slipped on easily and fastened and which can be removed just as easily all in a very confined space.

It is a further object of this invention to provide an insulating jacket assembly which can be very quickly installed and removed and which uses a minimum of material over and over again.

In the drawings:

Figure 1 is a side elevation of the generator bus bar having the traction motor cables attached thereto and shows the new insulating jacket in section and the sealing plug in dotted lines.

Figure 2 is a view taken on the line 2—2 of Figure 1 looking away from the generator and shows how the insulating jacket fits tightly around the bus bar and also how a pair of cooperating lips and a metallic clip secure the jacket around the bus bar and the traction motor conducting cables.

Figure 3 is a view taken on the line 3—3 of Figure 1 looking toward the generator which shows the general configuration of the jacket and a separate sealing plug.

Figure 4 is a top view of the assembly with the insulating jacket shown in section.

Figure 5 is a perspective view of the assembly which shows how the flexible jacket may be placed around the bus bar and the cables to engage the inner contours of the jacket and also lock the sealing plug against longitudinal movement relative to the insulating jacket.

Referring now to the accompanying drawings the generator is indicated generally by the numeral 2 and has attached thereto a terminal bus bar which has been given a reference numeral 4. Attached to the bus bar 4 and extending generally in the same longitudinal direction are four traction motor conductors 6 having the usual insulating coats 8. Secured to the ends of the conductors 6 are metallic conductor end terminals 10 having relatively flat ends 12 which are adapted to be fastened in electrical contact making relation to the bus bar 4 by nuts 16 and bolts 14 extending through aligned holes in the end portions 12 and the bus bars 4. Washers 18 separate the terminal ends 12 from the nuts 16 and the heads of the bolts 14 to reduce stress concentration and assure better electrical contact between bus bar and terminal ends.

The new insulating assembly for effectively insulating the connection between the insulated conductors 6 and the bus bar 4 will now be described. The assembly comprises a flexible insulating jacket 20 preferably formed from some plastic material. The jacket 20 consists of a single piece of flexible material having a pair of cooperating interlocking lips 22 which may be secured together by a pair of sliding clips 24. One end 26 of the jacket 24 is formed to encase the bus bar 4 and the conductor terminal ends 12 so that the end 26 snugly engages insulating material 28 (shown by means of stippling on the generator housing and as tape on the extreme generator end of the bus bar 4) along the junctures 30. The other end of the jacket 20 is provided with corrugations 32 having inner surfaces which, when in normal position around the insulated conductors 6, snugly engage the outer surfaces of the insulating covers 8 to hold them in circumferentially spaced relation.

The cover 20 alone will serve as an effective insulator for the conductor joint to prevent short circuiting and also protect personnel from injury. However, to seal the joint against foreign matter and weather, a unique plug has been provided which cooperates with the jacket 20 to completely seal the connective joint from any outside interference. The unique plug is indicated generally by the numeral 34 and is shown interposed between the insulated conductors 6. Recesses 36 on the plug are formed so as to receive the outer surfaces of the insulated conductors 6 and form a weather tight seal therewith. The plug 34 along with its recesses 36 also helps to properly space the insulated conductors 6 with respect to each other and also with respect to the jacket 20 when the jacket is in its normal insulating position. It will be noted that the plug 34 is provided with notches 38 intermediate its ends, which are adapted to receive associated locking projections or bosses 40 formed at one end of the jacket 20. When the jacket 20 and the plug 34 are in the normal insulating position, these projections 40 fit into the notches 38 and prevent the plug 34 from moving longitudinally with respect to the insulating jacket 20. The surfaces of the plug 34 also cooperate with and engage the inner and end surfaces of the corrugations 32 to provide weather proof junctures around each of the insulated cables to effectively seal out all weather and any other foreign matter which otherwise might enter into and interfere with the electrical connection between the cables and the bus bar 4.

In order to realize how very simply this insulating assembly may be attached to the illustrated cable joint, it may be explained that the jacket 20 is first placed around the insulated cables well away from the connective joints between the bus bar and cables. Also well away from the joint, the plug 34 then may be inserted between the various traction motor cables so as to properly space these cables. The jacket and the plug then may be slid or moved longitudinally along the cables and over the joint, the lips 22 being moved apart conveniently so as to allow the jacket to pass over the joint until the jacket is placed as close to the generator housing as is deemed necessary. The plug 34 may then be moved into position to align the notches 38 and the projections 40 so that the interlocking lips 22 may be brought together in cooperating relation. After the jacket and the plug have been moved into position and the interlocking lips have been placed together, the clips 24 may be placed at the ends of the lips 22 away from the bus bar 4 and slid longitudinally therealong. After the clips 24 have been slid longitudinally along the lips 22 until they are in the position shown in Figure 1, the jacket 20 in combination with the plug 34 provides an effective insulating assembly which forms tight and weather proof junctures 30 with the insulating tape 28 on the bus bar 4 and the insulating material around the conductors 6. It should be appreciated at this point that this jacket and plug 34, as well as the clips 24, can all be applied to the connective joint primarily by means of longitudinal movements. This is a great advantage when working in the confined spaces usually encountered after the generator has been mounted in the locomotive. It may also be readily appreciated that it is a very simple matter to remove and replace the insulating assembly and also that this insulating assembly can be used over and over again. In other words, this new and unique assembly is simple, easy to install and replace, and affords a substantial saving in labor, time and materials over other insulating devices currently in use.

I claim:

1. An insulating and sealing assembly for a bare electrical joint between an electrical bus bar and a plurality of insulated electrical conductors all extending in the same general direction, said assembly comprising a flexible jacket of insulating material having a pair of longitudinally extending interlocking lips separable to apply said jacket around said joint, a separate sealing and insulator plug insertable between said plurality of conductors on one side of said electrical joint, surfaces on said plug, inner surfaces on said jacket adapted to form sealing junctures between surfaces on said plug and said insulated conductors to completely seal and insulate one side of said joint, longitudinally slidable fastening means for said lips to maintain said lips in interlocking relationship with each other and to maintain said jacket around said joint, and means associated with said plug and jacket when in place around the joint to prevent relative movement thereof with respect to said jacket.

2. An insulating and sealing assembly for a bus bar terminal connection including a bus bar and a plurality of insulated electrical conductors fastened thereto and extending in the same general direction, said insulating and sealing assembly comprising a sealing and insulating plug insertable between said conductors, said plug having recesses adapted to receive said insulated conductors to form a sealing juncture therewith, said recesses being arranged to maintain said conductors in circumferential spaced relationship with respect to each other, an enclosing protective member of flexible insulating material having inner surfaces and bosses at the ends thereof, said member having longitudinally extending inter-locking normally engageable lips separable to place said member around said connection and said plug, fastening means to secure said lips together including a pair of longitudinally slidable clips, and notches on said plug engageable with said bosses to prevent longitudinal movement of said plug relative to said member, said surfaces being cooperable with said plug and said conductors and bus bar to form weather tight junctures therewith.

References Cited in the file of this patent

UNITED STATES PATENTS

| 1,996,565 | Boeh et al. | Apr. 2, 1935 |
| 2,414,498 | Warner et al. | Jan. 21, 1947 |
| 2,583,318 | Benbow | Jan. 22, 1952 |

FOREIGN PATENTS

| 190,515 | Switzerland | July 1, 1937 |